(12) United States Patent
Pandian

(10) Patent No.: US 10,954,974 B2
(45) Date of Patent: Mar. 23, 2021

(54) ACTUATOR ASSEMBLY WITH LOST MOTION DEVICE

(71) Applicant: Hamilton Sundstrand Corporation, Charlotte, NC (US)

(72) Inventor: Navaneethakrishnan Pandian, Karnataka (IN)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 167 days.

(21) Appl. No.: 15/847,401

(22) Filed: Dec. 19, 2017

(65) Prior Publication Data
US 2019/0120262 A1    Apr. 25, 2019

(30) Foreign Application Priority Data
Oct. 20, 2017    (IN) .............................. 201711037205

(51) Int. Cl.
| F15B 15/14 | (2006.01) |
|---|---|
| F01D 25/24 | (2006.01) |
| B64D 29/08 | (2006.01) |

(52) U.S. Cl.
CPC ............ *F15B 15/148* (2013.01); *B64D 29/08* (2013.01); *F01D 25/24* (2013.01); *F05D 2220/32* (2013.01); *F05D 2230/72* (2013.01); *F05D 2260/57* (2013.01)

(58) Field of Classification Search
CPC ..................................................... F15B 15/148
USPC ............................................................ 92/84
See application file for complete search history.

(56) References Cited

U.S. PATENT DOCUMENTS

| 1,453,270 | A | * | 5/1923 | Burton | .................. | F02N 99/008 |
| | | | | | | 417/561 |
| 2,323,742 | A | * | 7/1943 | Webster | ................... | F02B 75/38 |
| | | | | | | 92/84 |
| 2,345,663 | A | * | 4/1944 | Franck | .................. | F02N 99/008 |
| | | | | | | 417/496 |
| 3,831,999 | A | * | 8/1974 | Sonneborn | ............. | B62D 33/07 |
| | | | | | | 180/89.14 |
| 3,878,769 | A | * | 4/1975 | Farmer | ................... | B66F 9/184 |
| | | | | | | 92/51 |
| 3,882,761 | A | * | 5/1975 | Snitgen | ................ | B23Q 16/008 |
| | | | | | | 92/29 |

(Continued)

FOREIGN PATENT DOCUMENTS

| BE | 456059 A | 10/2018 |
| GB | 434493 A | 8/1935 |
| KR | 101061107 B1 | 8/2011 |

OTHER PUBLICATIONS

EP Search Report; EP 18201778; dated Mar. 25, 2019; 7 pages.

*Primary Examiner* — Abiy Teka
*Assistant Examiner* — Matthew Wiblin
(74) *Attorney, Agent, or Firm* — Cantor Colburn LLP

(57) ABSTRACT

An actuator assembly includes a housing, a piston rod, and a lost motion device. The housing defines a housing bore that extends along a first axis from a first housing end towards a second housing end. The piston rod is at least partially disposed within the housing bore. The piston rod defines a piston bore that extends from a first piston end towards a second piston end along the first axis. The lost motion device is at least partially disposed within the housing bore and extends into the piston bore. The lost motion device and the piston rod are arranged to move relative to the housing along the first axis.

4 Claims, 2 Drawing Sheets

(56) References Cited

U.S. PATENT DOCUMENTS

| | | | | |
|---|---|---|---|---|
| 4,527,463 | A | * | 7/1985 | Albarda .................... F04B 9/06 |
| | | | | 92/84 |
| 4,901,474 | A | | 2/1990 | Bayard et al. |
| 5,301,598 | A | * | 4/1994 | Sonnabend ............. B21B 31/32 |
| | | | | 92/113 |
| 5,816,634 | A | * | 10/1998 | Jacobs .................... B25G 1/01 |
| | | | | 294/57 |
| 6,595,105 | B2 | * | 7/2003 | An ...................... F04B 39/0005 |
| | | | | 92/140 |
| 2012/0125191 | A1 | | 5/2012 | Moradell-Casellas et al. |
| 2012/0267181 | A1 | * | 10/2012 | Krobot ................. F15B 15/148 |
| | | | | 180/89.14 |

* cited by examiner

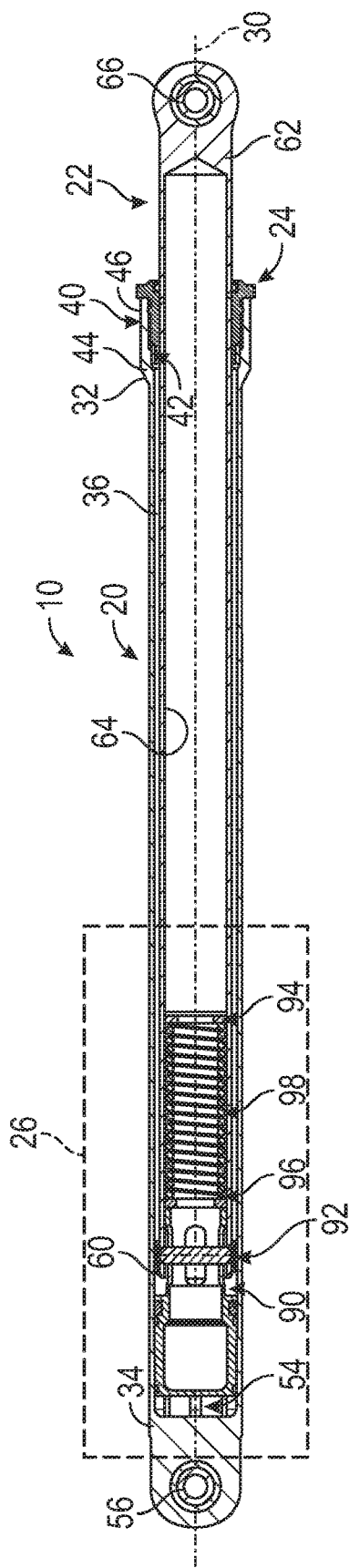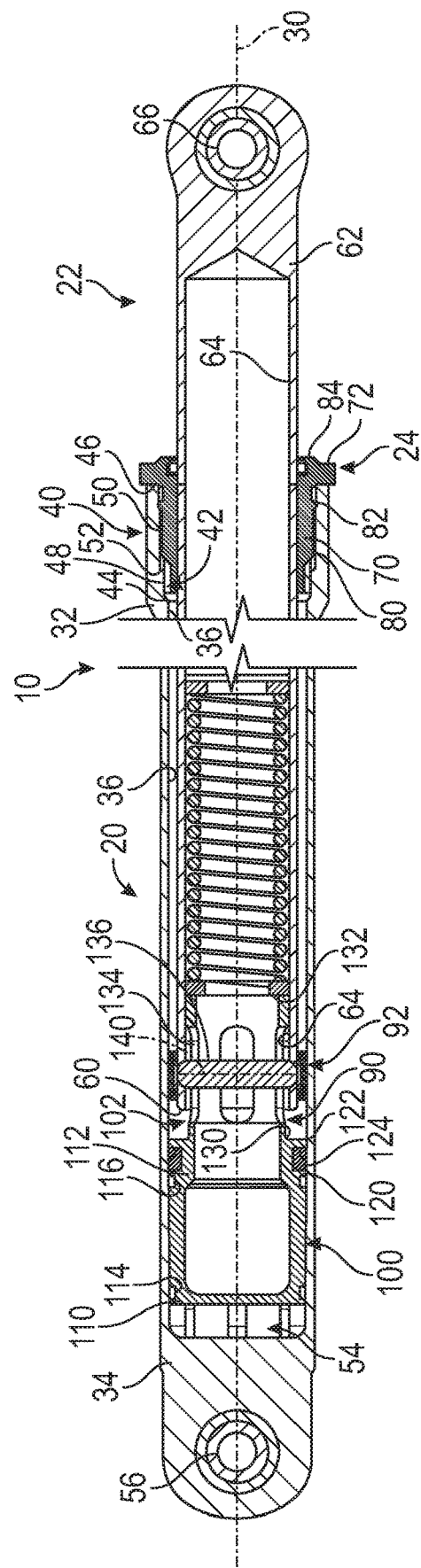
FIG. 1
FIG. 2

ACTUATOR ASSEMBLY WITH LOST MOTION DEVICE

CROSS-REFERENCE TO RELATED APPLICATIONS

This application claims the benefit of IN Application No. 201711037205, filed Oct. 20, 2017, which is incorporated herein by reference in its entirety.

BACKGROUND

Exemplary embodiments pertain to the art of linear actuators for opening a gas turbine engine nacelle.

A gas turbine engine is generally provided with a cowl or door that is movable to allow access to perform maintenance tasks. A ground service technician may operate an actuator to move the cowl or door between an open position and a closed position. Relative motion between the nacelle and a gas turbine engine fan case may impart a load to the actuator that may affect sealing performance of seals associated with the actuator.

Accordingly it is desirable to provide a more robust actuator that is less susceptible to imparted relative motion and loads.

BRIEF DESCRIPTION

Disclosed is an actuator assembly that includes a housing, a piston rod, and a lost motion device. The housing defines a housing bore that extends along a first axis from a first housing end towards a second housing end. The piston rod is at least partially disposed within the housing bore. The piston rod defines a piston bore that extends from a first piston end towards a second piston end along the first axis. The lost motion device is at least partially disposed within the housing bore and extends into the piston bore. The lost motion device and the piston rod are arranged to move relative to the housing along the first axis.

In addition to one or more of the features described herein, the lost motion device includes a slider having a head that is slidably engaged with housing bore and is disposed proximate the second housing end and a neck extending from the head and into the piston bore.

In addition to one or more of the features described herein, the slider is slidably connected to the piston rod proximate the first piston end.

In addition to one or more of the features described herein, the lost motion device includes a biasing member that is disposed within the piston bore.

In addition to one or more of the features described herein, the biasing member engages a first spring seat that is secured within the piston bore between the first piston end and the second piston end and engages a second spring seat that is disposed proximate the first piston end.

In addition to one or more of the features described herein, the second spring seat engages an end of the neck.

In addition to one or more of the features described herein, a bearing member is disposed about the first piston end and engages the housing bore.

In addition to one or more of the features described herein, a sealing member is disposed about the piston rod and is engaged with the housing bore proximate the first housing end.

In addition to one or more of the features described herein, the second piston end is provided with a yoke.

Also disclosed is an actuator assembly that includes a housing, a piston rod, and a lost motion device. The housing defines a housing bore that extends from a first housing end towards a second housing end. The housing defines a flared portion that extends from the first housing end. The piston rod is at least partially slidably disposed within the housing bore. The piston rod defines a piston bore that extends from a first piston end towards a second piston end. The lost motion device includes a slider having a head that is disposed within the housing bore and a neck extending from the head and extends into the piston bore.

In addition to one or more of the features described herein, the neck defines an elongate opening that is arranged to receive a pin that extends through the first piston end to movably connect the slider to the piston rod.

In addition to one or more of the features described herein, the head has a head diameter and the neck has a neck diameter that is less than the head diameter.

In addition to one or more of the features described herein, the head has a head diameter and the piston rod has a rod diameter that is less than the head diameter.

In addition to one or more of the features described herein, the head is provided with a first sealing projection and a second sealing projection that engage the housing bore.

In addition to one or more of the features described herein, a hydraulic sealing groove is defined between the first sealing projection and the second sealing projection.

In addition to one or more of the features described herein, a first spring seat is fixedly positioned within the piston bore and a second spring seat is disposed within the piston bore and is disposed proximate an end of the neck.

In addition to one or more of the features described herein, a biasing member is disposed within the piston bore and extends between the first spring seat and the second spring seat.

In addition to one or more of the features described herein, a sealing member is disposed about the piston rod and is disposed proximate the first housing end.

In addition to one or more of the features described herein, the sealing member is provided with a flange that abuts a distal end of the flared portion.

In addition to one or more of the features described herein, a bearing member is disposed about the first piston end and engages the housing bore.

BRIEF DESCRIPTION OF THE DRAWINGS

The following descriptions should not be considered limiting in any way. With reference to the accompanying drawings, like elements are numbered alike:

FIG. 1 is a schematic view of an actuator assembly;

FIG. 2 is a segmented schematic view of the actuator assembly having a lost motion device and a sealing member.

DETAILED DESCRIPTION

Figure 3:
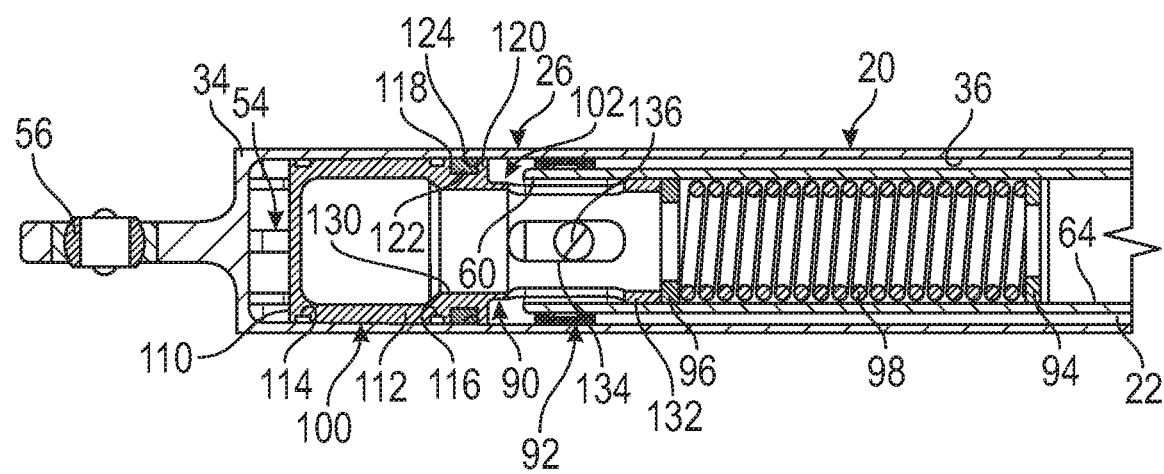
FIG. 3 is a view of the lost motion device of the actuator assembly.

A detailed description of one or more embodiments of the disclosed apparatus and method are presented herein by way of exemplification and not limitation with reference to the Figures.

Gas turbine engines may be disposed within a nacelle having a cowl or an access door to enable ground maintenance personnel to service the gas turbine engine. The cowl or access door may be movable between an open position and a closed position by a hydraulically operated door opening system. Referring to FIGS. 1-3, the door opening system includes an actuator assembly 10. The actuator assembly 10 may be a linear actuator assembly that is displaceable or extensible along an axis. The actuator assembly 10 includes a housing 20, a piston rod 22, a sealing member 24, and a lost motion device 26.

The housing 20 extends along a first axis 30 between a first housing end 32 and a second housing end 34. The housing 20 defines a housing bore 36 that extends from the first housing end 32 towards the second housing end 34. The housing 20 is configured as a hollow member such that the first housing end 32 is configured as an open end and the second housing end 34 is configured as a closed end.

Referring to FIGS. 2 and 3, the first housing end 32 includes a flared portion 40. The flared portion 40 has a cross-sectional diameter or cross-sectional form that is greater than a cross-sectional diameter or cross-sectional form of the remainder of the housing 20 that extends between the first housing end 32 and the second housing end 34. A portion of the housing bore 36 proximate the flared portion 40 includes a stepped region 42. The stepped region 42 extends between a proximal end 44 of the flared portion 40 towards a distal end 46 of the flared portion 40. The stepped region 42 includes a first stepped surface 48 and a second stepped surface 50. The first stepped surface 48 extends from the first housing end 32 towards the second stepped surface 50. The second stepped surface 50 extends from the first stepped surface 48 towards the distal end 46 of the flared portion 40. In at least one embodiment, a shoulder 52 extends between the first stepped surface 48 and the second stepped surface 50.

As shown in FIGS. 1 and 2, a stop member 54 is disposed within the housing bore 36 and is disposed proximate the second housing end 34. The stop member 54 may be defined by the housing 20 and extend into the housing bore 36 proximate the second housing end 34.

Referring to FIGS. 1-3, the housing 20 may include or define a first mounting feature 56. The first mounting feature 56 may be configured as an eye or yoke that may be attached to a component of the gas turbine engine or may be attached to a ground service cart.

The piston rod 22 is at least partially disposed within the housing bore 36. The piston rod 22 extends along the first axis 30 between a first piston end 60 and a second piston end 62. The piston rod 22 has a rod diameter or cross-sectional rod form.

The piston rod 22 is movably disposed within the housing 20 such that while the actuator assembly 10 is in a first position (retracted position or non-extended position) the first piston end 60 is disposed proximate the second housing end 34 and while the actuator assembly 10 is in a second position (extended position or non-retracted position) the first piston end 60 is spaced apart from the second housing end 34 or is disposed closer to the first housing end 32 as compared to the first position.

Referring to FIGS. 1 and 2, the piston rod 22 defines a piston bore 64 that extends from the first piston end 60 towards the second piston end 62 along the first axis 30. The piston rod 22 is configured as a hollow member such that the first piston end 60 is configured as an open end and the second piston end 62 is configured as a closed end.

The second piston end 62 may include or define a second mounting feature 66. The second mounting feature 66 is integrally formed with the piston rod 22. The second mounting feature 66 may be configured as an eye or yoke that may be attached to a movable component of the gas turbine engine such as a cowl, a door, an access panel, or the like. The second piston end 62 having the second mounting feature 66 may move relative to the first housing end 32 to move the movable component of the gas turbine engine between an open position and a closed position based on actuation of the actuator assembly 10.

The sealing member 24 is disposed about the piston rod 22 proximate the second piston end 62. The sealing member 24 is disposed within and is engaged with the housing bore 36 proximate the first housing end 32. More specifically, the sealing member 24 is disposed within the stepped region 42 and engages the second stepped surface 50 of the housing bore 36.

The sealing member 24 includes a sealing member body 70 and a sealing member flange 72. The sealing member body 70 is at least partially disposed within the stepped region 42 of the housing bore 36.

The sealing member body 70 includes a first protrusion 80, a second protrusion 82, and a notch 84. The first protrusion 80 and the second protrusion 82 are axially spaced apart from each other, with respect to the first axis 30. The first protrusion 80 and the second protrusion 82 radially extend from the sealing member body 70, with respect to the first axis 30, and engage the second stepped surface 50 of the housing bore 36. The notch 84 is disposed proximate an end of the sealing member body 70 and is arranged to receive a seal that engages the piston rod 22.

The sealing member flange 72 extends from the sealing member body 70. The sealing member flanged 72 radially extends from the sealing member body 70 and engages the distal end 46 of the flared portion 40 of the housing 20. The sealing member flange 72 is a cross-sectional diameter or cross-sectional form that is greater than a cross-sectional diameter or cross-sectional form of the flared portion 40 of the housing 20.

Referring to FIGS. 1-3, the lost motion device 26 is at least partially disposed within the housing bore 36 and extends into the piston bore 64. The lost motion device 26 is disposed proximate the second housing end 34 and the first piston end 60. The lost motion device 26 is operatively connected to the piston rod 22 and is arranged to move relative to the housing 20 along the first axis 30 between the first position and the second position with the piston rod 22.

The lost motion device 26 includes a slider 90, a bearing member 92, a first spring seat 94, a second spring seat 96, and a biasing member 98.

Referring to FIGS. 2 and 3, the slider 90 is movably or slidably connected to the piston rod 22 proximate the first piston end 60. The slider 90 includes a head 100 and a neck 102 that extends from the head 100.

The head 100 is an enlarged head that is slidably engaged with the housing bore 36 and is disposed proximate the second housing end 34 while the actuator assembly 10 is in the first position. The head 100 has a head diameter that is greater than the rod diameter, in other words, the rod diameter is less than the head diameter.

The head 100 extends between a first head end 110 and a second head end 112 along the first axis 30. The first head end 110 may engage the stop member 54 while the actuator assembly 10 is in the first position. The second head end 112 is spaced apart from the stop member 54 and is disposed proximate the first piston end 60. The head 100 defines a first bearing ring groove 114 that is disposed proximate the first head end 110 and a second bearing groove 116 that is disposed proximate the second head end 112. Each of the first bearing ring groove 114 and the second bearing ring groove 116 are arranged to receive a seal or a bearing ring.

The head 100 further includes or defines a first sealing projection 118 and the second sealing projection 120 that is axially spaced apart from the first sealing projection 118. The first sealing projection 118 and the second sealing projection 120 engage the housing bore 36. A hydraulic sealing groove 122 is defined between the first sealing projection 118 and the second sealing projection 120. The hydraulic sealing groove 122 is arranged to receive a hydraulic seal 124 that engages the housing bore 36.

The neck 102 has a neck diameter that is less than the head diameter. The neck 102 extends from the second head end 112 and extends into the piston bore 64. The neck 102 extends between a first neck end 130 and a second neck end 132 along the first axis 30. In at least one embodiment, the first neck end 130 is spaced apart from and is not disposed within the piston bore 64.

The neck 102 defines at least one elongate opening 134 that is disposed between the first neck end 130 and the second neck end 132. A pin 136 extends along a second axis 140 that is disposed transverse to the first axis 30. The pin 136 extends through the first piston end 60 of the piston rod 22 and through the at least one elongate opening 134 to movably connect the slider 90 to the piston rod 22. The combination of the at least one elongate opening 134 and the pin 136 enables the slider 90 to move relative to the piston rod 22 at least until the pin 136 engages an end of the at least one elongate opening 134.

The bearing member 92 is disposed about the piston rod 22 proximate the first piston end 60. The bearing member 92 engages the housing bore 36. The bearing member 92 is proximately aligned with the pin 136 along the second axis 140. In at least one embodiment, the pin 136 at least partially extends into the bearing member 92.

The first spring seat 94 is fixedly positioned or fixedly disposed within the piston bore 64. The first spring seat 94 may be defined by a retaining member that is secured within the piston bore 64.

The second spring seat 96 is movably positioned or movably disposed within the piston bore 64 and is axially spaced apart from the first spring seat 94. The second spring seat 96 may be defined by a retaining member that is disposed within the piston bore. The second spring seat 96 is disposed proximate and may abut the second neck end 132. In at least one embodiment, the second spring seat 96 may be defined by the second neck end 132 of the neck 102 and may not be a separately provided component.

The biasing member 98 is disposed within the piston bore 64 and extends between and engages the first spring seat 94 and the second spring seat 96. Biasing member 98 biases the slider 90 towards the second housing end 34. The biasing member 98 is arranged or positioned to compress or extend responsive to movement of the slider 90 along the first axis 30 relative to the piston rod 22. The biasing member 98 of lost motion device 26 absorbs, damps, or dissipates vibrations or push and pull motion to protect the dynamic hydraulic sealing provided by the various sealing features of the actuator assembly 10 to prevent leaks or water intrusion.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An actuator assembly, comprising:
    a housing defining a housing bore that extends along a first axis from a first housing end towards a second housing end and through only the first housing end;
    a piston rod at least partially disposed within the housing bore, the piston rod defining a piston bore that extends from a first piston rod end towards a second piston rod end along the first axis;
    a first mounting feature formed at the second housing end and a second mounting feature formed at the second piston rod end, the first and second mounting features, formed on the first axis, the first mounting feature formed as an eye or yoke, and the second mounting feature formed as another eye or yoke; and
    a lost motion device at least partially disposed within the housing bore and extending into the piston bore, the lost motion device and the piston rod being arranged to move relative to the housing along the first axis, the lost motion device comprising:
    a slider having a head that is disposed within the housing bore, extending between a first head end and a second head end along the first axis, and a neck extending from the second head end into the piston bore at the first piston rod end, wherein the neck is configured to slide within piston bore along the first axis,
    wherein a neck diameter of the neck is less than a piston bore diameter of the piston bore, the piston bore diameter is less than a head diameter of the head, so that the head is slidably engaged with the housing bore to slide along the first axis in the housing bore while the slider slides in the piston bore, and
    wherein the slider engages the piston rod along the first axis via a biasing member disposed within the piston bore at the first piston rod end,
    wherein:
    the head is provided with a first sealing projection and a second sealing projection that engage the housing bore, and a hydraulic sealing groove being defined between the first sealing projection and the second sealing projection;
    the neck defines an elongate opening that is arranged to receive a pin that extends through the first piston rod end to movably connect the slider to the piston rod, the pin enabling the slider to move relative to the piston rod at least until the pin engages an end of the elongate opening;

the head defining a first bearing ring groove that is disposed proximate the first head end and a second bearing groove that is disposed proximate the second head end, each of the first bearing ring groove and the second bearing ring groove being arranged to receive a seal or a bearing ring;

a stop member within the housing bore, extending from the second housing end to engage the first head end; and wherein:

the biasing member is a spring disposed within the piston bore, and the biasing member extends between and engages: a first spring seat that is secured within the piston bore between the first piston rod end and the second piston rod end; and a second spring seat that is disposed proximate the first piston rod end, and the second spring seat engages a neck end of neck of the slider that is within the piston bore; and a bearing member is disposed about the first piston rod end, wherein the bearing member engages the housing bore and the bearing member is between the neck end of the neck of the slider that is within the piston bore and another neck end of the neck of the slider that is outside of the piston bore, and wherein the bearing member is aligned with the pin and the pin extends at least partially into the bearing member.

2. The actuator assembly of claim 1, further comprising: a sealing member that is disposed about the piston rod that is engaged with the housing bore proximate the first housing end.

3. The actuator assembly of claim 1, further comprising: a sealing member that is disposed about the piston rod and is disposed proximate the first housing end.

4. The actuator assembly of claim 3, wherein the sealing member is provided with a flange that abuts a distal end of a flared portion of the first housing end.

\* \* \* \* \*